US012658641B2

(12) United States Patent
Brekosky et al.

(10) Patent No.: US 12,658,641 B2
(45) Date of Patent: Jun. 16, 2026

(54) LEVER AND HEADER GEAR TOOTH ENGAGEMENT TO PREVENT PREMATURE CONNECTOR MATING

(71) Applicant: TE Connectivity Solutions GmbH, Schaffhausen (CH)

(72) Inventors: Lawrence John Brekosky, Middletown, PA (US); Vinayakumar Shettar, Mechanicsburg, PA (US); Ramesh S, Bangalore (IN)

(73) Assignee: TE Connectivity Solutions GmbH, Schaffhausen (CH)

( * ) Notice: Subject to any disclaimer, the term of this patent is extended or adjusted under 35 U.S.C. 154(b) by 341 days.

(21) Appl. No.: 18/203,815

(22) Filed: May 31, 2023

(65) Prior Publication Data

US 2024/0356282 A1 Oct. 24, 2024

(51) Int. Cl.
*H01R 13/629* (2006.01)
*H01R 13/627* (2006.01)
*H01R 13/639* (2006.01)

(52) U.S. Cl.
CPC ... *H01R 13/62944* (2013.01); *H01R 13/6273* (2013.01); *H01R 13/62955* (2013.01); *H01R 13/639* (2013.01)

(58) Field of Classification Search
CPC .......... H01R 13/62944; H01R 13/6273; H01R 13/62955; H01R 13/639
See application file for complete search history.

(56) References Cited

U.S. PATENT DOCUMENTS 5,722,843 A * 3/1998 Kerckhof ......... H01R 13/62944 439/372
6,247,966 B1 * 6/2001 Klein ................. H01R 13/4223 439/752
6,540,532 B1 * 4/2003 Martin ............. H01R 13/62944 439/372
6,558,176 B1 * 5/2003 Martin ............. H01R 13/62944 439/372
6,736,655 B2 * 5/2004 Martin ............. H01R 13/62944 439/372
7,052,294 B1 * 5/2006 Osada .............. H01R 13/62955 439/157
7,641,486 B2 * 1/2010 Tonosaki ......... H01R 13/62938 439/372
8,197,270 B2 * 6/2012 Vasbinder ........ H01R 13/62977 439/157

(Continued)

*Primary Examiner* — Thanh Tam T Le

(57) ABSTRACT

A connector assembly has a first connector and a second connector. The first connector has a first connector housing. A lever is rotatably mounted relative to the first connector housing. The lever has lever arms with projections provided at free ends of the lever arms, The second connector has a second connector housing. A lever receiving recess with at least one latching projection is provided in the second connector housing. The at least one latching projection is configured to cooperate with the projections of the first connector housing. The lever is rotatable between a pre-insertion position and an insertion position. The cooperation of the lever with the lever receiving recess prevents the premature mating of the first connector housing to the second connector housing as the lever is moved between the pre-insertion position and the insertion position.

12 Claims, 6 Drawing Sheets

(56) References Cited

U.S. PATENT DOCUMENTS

| | | | | |
|---|---|---|---|---|
| 8,662,906 | B2 * | 3/2014 | Schmitt | H01R 13/62955 439/372 |
| 8,784,127 | B2 * | 7/2014 | Bashkin | H01R 13/62955 439/372 |
| 9,142,916 | B2 * | 9/2015 | Allgood | H01R 13/516 |
| 9,178,307 | B2 * | 11/2015 | Papurcu | H01R 13/62977 |
| 9,425,554 | B2 * | 8/2016 | Iwatani | H01R 13/641 |
| 10,511,125 | B2 * | 12/2019 | Shindo | H01R 13/62938 |
| 11,688,977 | B2 * | 6/2023 | Shettar | H01R 13/516 439/157 |
| 11,837,821 | B2 * | 12/2023 | Murakami | H01R 13/639 |

* cited by examiner

LEVER AND HEADER GEAR TOOTH ENGAGEMENT TO PREVENT PREMATURE CONNECTOR MATING

FIELD OF THE INVENTION

The present invention relates to a mating assist locking lever for an electrical connector which prevents premature connector mating. The present invention also relates to a mating assist locking lever which can be easily engaged by an operator.

BACKGROUND OF THE INVENTION

Connector assemblies may have a plug connector, a mating connector, and an actuation means for moving one of the connectors into engagement with the other connector such that receptacle contacts of the plug connector are electrically connected to pluggable contacts of the mating connector. These types of arrangements are primarily used in applications having high pin counts and where a low engagement force is needed.

In order to save space, the plug connector is formed so that only a small portion of the plug connector projects from the mating connector when the connectors are engaged. This configuration causes the disengagement of the plug connector from the mating connector to be difficult. A problem also exists in that the plug connector arrangement has a large number of contact elements that exert a high normal contact force such that considerable force is required to plug-in and release the plug connector from the mating connector.

In order to resolve these problems, various connector arrangements have been provided with levers with camming members. For example, the levers may be provided on receptacle connectors. Movement of a plug connector toward the receptacle connector can be facilitated by the rotation of the lever with respect to the direction of the movement of the plug connector toward the mating connector.

While the conventional connector levers may provide a mechanical assists to reduce mating force, the levers of the known connectors allow for the first connector housing to be improperly partially mated to the header. This occurs as a lever incorrectly engages a top set of gear teeth of the first connector housing, thereby preventing the full mating of first connector housing with the header. This provides a false sense that proper mating between the first connector housing and the header has occurred.

In addition, with known locking levers, the lever rests approximately parallel to and proximate to a surface of the substrate on which the header is mounted when the lever is in the unlocked position. Consequently, there is only a small amount of clearance between the lever and the surface of the substrate, making it difficult for an operator to grip the lever when the lever must be moved from the unlocked position to the locked position.

It is therefore desirable to develop a lever for use with a plug connector which overcomes the problems of the known art. In particular, it would be beneficial to provide a lever for an electrical connector which prevents premature connector mating to ensure that the plug connector and header are fully mated when the lever is in the locked position. It would also be beneficial to provide a lever which can be easily engaged by an operator, to enable the operator to move the lever between a preinsertion, open or unlocked position and an inserted, closed or locked position.

SUMMARY OF THE INVENTION

An embodiment is directed to a connector assembly having a first connector and a second connector. The first connector has a first connector housing. A lever is rotatably mounted relative to the first connector housing. The lever has lever arms with projections provided at free ends of the lever arms, The second connector has a second connector housing. A lever receiving recess with at least one latching projection is provided in the second connector housing. The at least one latching projection is configured to cooperate with the projections of the first connector housing. The lever is rotatable between a pre-insertion position and an insertion position. The cooperation of the lever with the lever receiving recess prevents the premature mating of the first connector housing to the second connector housing as the lever is moved between the pre-insertion position and the insertion position.

In an embodiment, the at least one latching projection is two latching projections. A first latching projection of the two latching projections is provided proximate to, but spaced from, a mounting surface of the second connector housing. A second projection of the two latching projections is provided proximate to, but spaced from, a connector mating face of the second connector housing. The second latching projection has a different configuration than the first latching projection. The second projection cooperates with the lever to prevent premature mating of the first connector into the second connector.

In an embodiment, the at least one latching projection is two latching projections. A first latching projection of the two latching projections is provided proximate to, but spaced from, the a mounting surface of the second connector housing. A second projection of the two latching projections is provided proximate to, but spaced from, a connector mating face of the second connector housing. A latch engaging projection extends from a side wall of the second connector housing, the latch engaging projection is positioned between the first latching projection and the second latching projection. The latch engaging projection cooperates with the lever to prevent premature mating of the first connector into the second connector.

In an embodiment, the projections provided at free ends of the lever arms of the first connector are at least two projections. A first projection of the at least two projections has a longer length than a second projection of the at least two projections. The first projection cooperates with the lever receiving recess to prevent premature mating of the first connector into the second connector.

An embodiment is directed to an electrical connector having a connector housing. A lever is rotatably mounted relative to the first connector housing. At least one lever lift assistant projection is provided on the lever. The at at least one lever left assistant projection is spaced from a substrate on which the first housing is mounted when the lever is in the pre-insertion position to allow an operator to engage and rotate the lever to the insertion position.

Other features and advantages of the present invention will be apparent from the following more detailed description of the illustrative embodiment, taken in conjunction with the accompanying drawings which illustrate, by way of example, the principles of the invention.

DETAILED DESCRIPTION OF THE INVENTION

Figure 1:
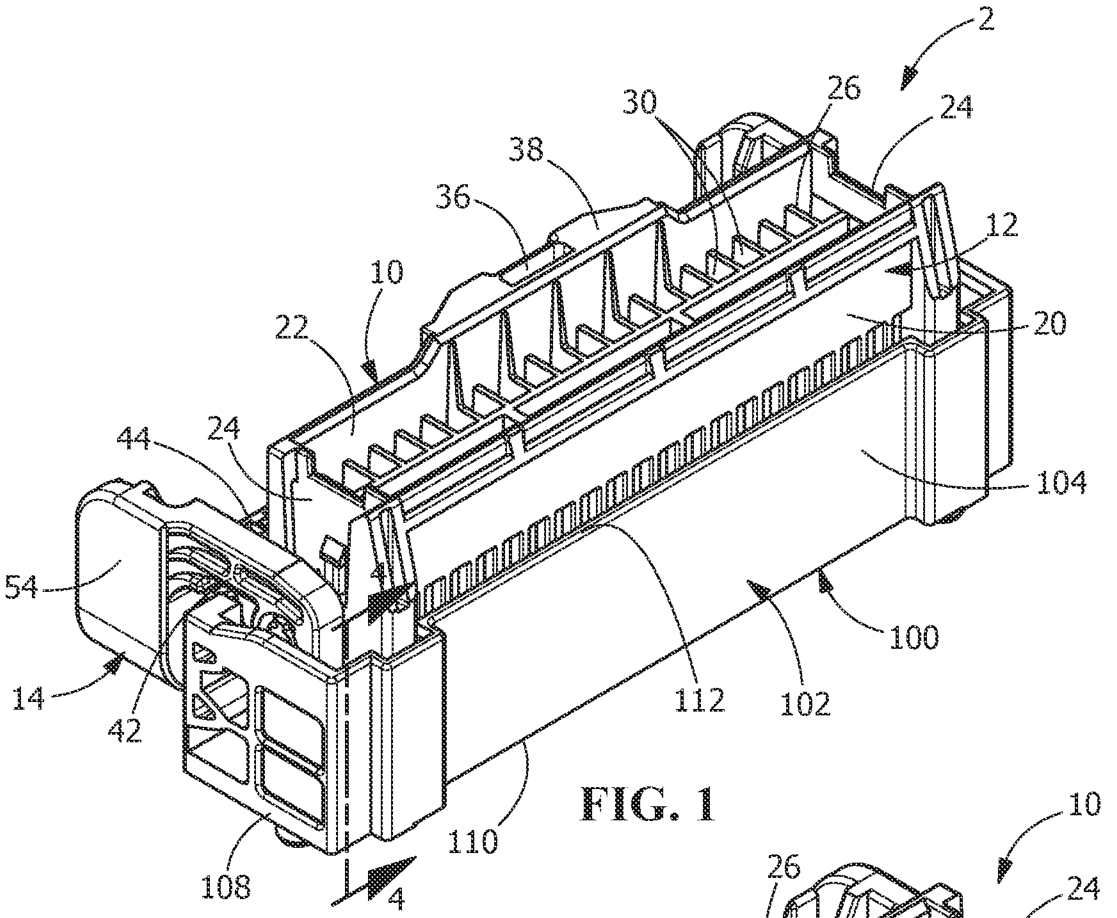
FIG. 1 is a perspective view of an illustrative connector assembly according to the present invention, showing a first connector inserted into a second connector, for ease of viewing the terminals and wires are not shown in the first or second connector, a lever is shown in a first or pre-insertion position.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

Moreover, the features and benefits of the invention are illustrated by reference to the preferred embodiments. Accordingly, the invention expressly should not be limited to such embodiments illustrating some possible non-limiting combination of features that may exist alone or in other combinations of features, the scope of the invention being defined by the claims appended hereto.

As shown in FIGS. 1 through 5, an illustrative embodiment of a connector assembly 2 includes a first or plug connector 10 and a second or mating connector or header 100. The first connector 10 and the second connector 100 are meant to be illustrative examples of the types of connectors which can be used. The size and configuration of the first connector 10 and the second connector 100 may vary.

The first or plug connector 10 includes a first connector housing 12 and a lever 14. The lever 14 is pivotably or rotatably mounted to the first connector housing 12. The lever 14 provides a mechanical assist for the mating of the plug connector 10, as will be more fully described.

Figure 2:
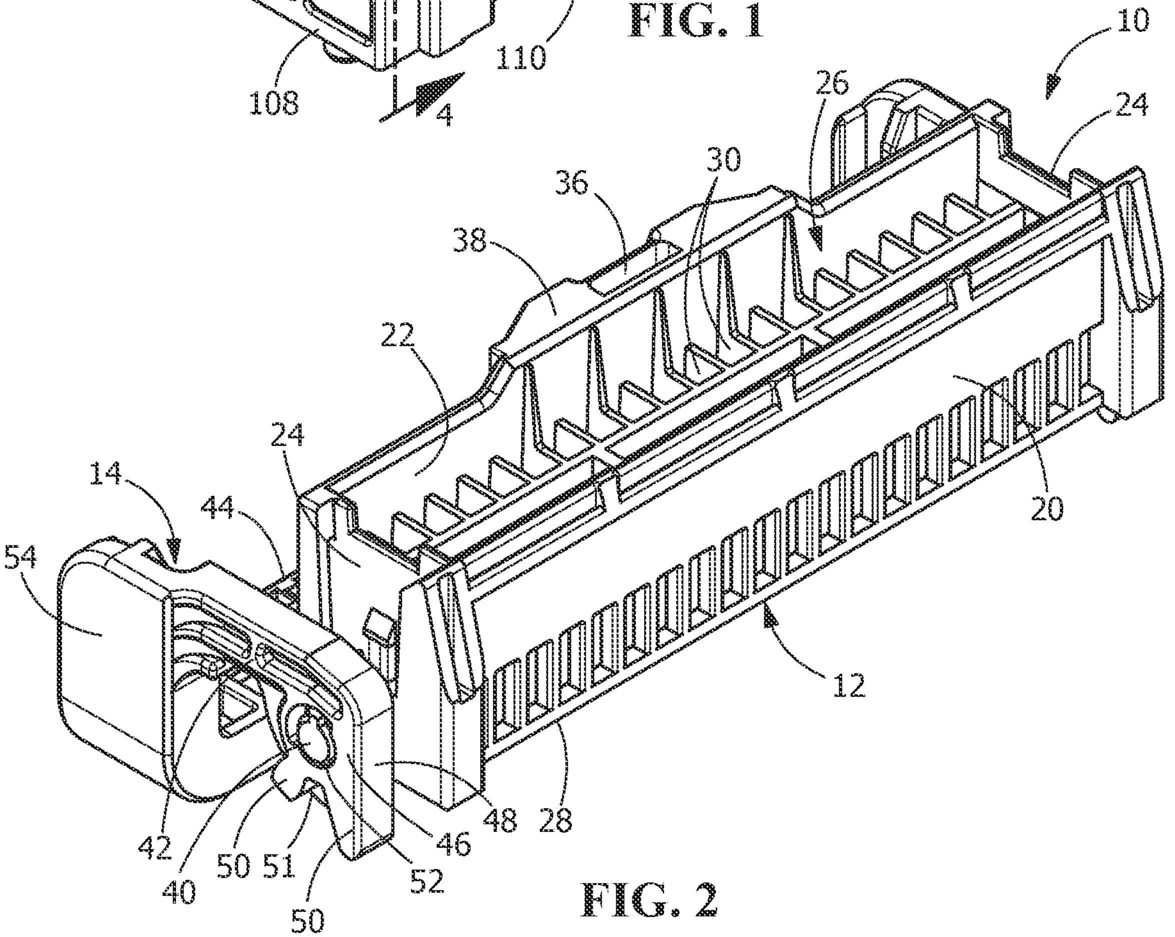
FIG. 2 is a perspective view the first connector of FIG. 1 with the lever exploded therefrom.

As shown in FIG. 2, the first connector housing 12 includes a front or first wall 20, a rear or second wall 22, and side walls 24. A wire receiving face 26 and an oppositely facing mating face 28 each extend between the first wall 20 and the second wall 22, and between the side walls 24. A plurality of contact or terminal receiving cavities 30 extend between the wire receiving face 26 and the mating face 28. The contact receiving cavities 30 are configured to house terminals (not shown) therein. Wires (not shown), which are in electrical engagement with the terminals, extend from the one or more of the contact receiving cavities 30 at the wire receiving face 26 of the first connector housing 12.

In the illustrative embodiment shown, the second wall 22 extends from the mating face 28 beyond the wire receiving face 26. The second wall 22 has a locking opening 36. The locking opening 36 is positioned proximate to the longitudinal center of the second wall 22 and proximate to a free end 38 of the second wall 22. However, other positioning and configurations of the locking opening 36 may be used.

Lever engaging projections 40 project outward from the side walls 24. In the illustrative embodiment shown, the lever engaging projections 40 are stub shafts with a circular cross-sectional diameter. However, other types and configurations of lever engaging projections 40 may be used.

As shown in FIG. 2, the lever 14 has two lever arms 42. A lever handle 44 extends between the lever arms 42. Each lever arm 42 has a rotary portion 46 provided at a free end 48. The rotary portions 46 include one or more latching or pinion teeth or projections 50 and one or more recess 51. Projections receiving openings 52 are positioned at a central location of the rotary portion of 46 to be received over the lever engaging projections 40.

Figure 11:
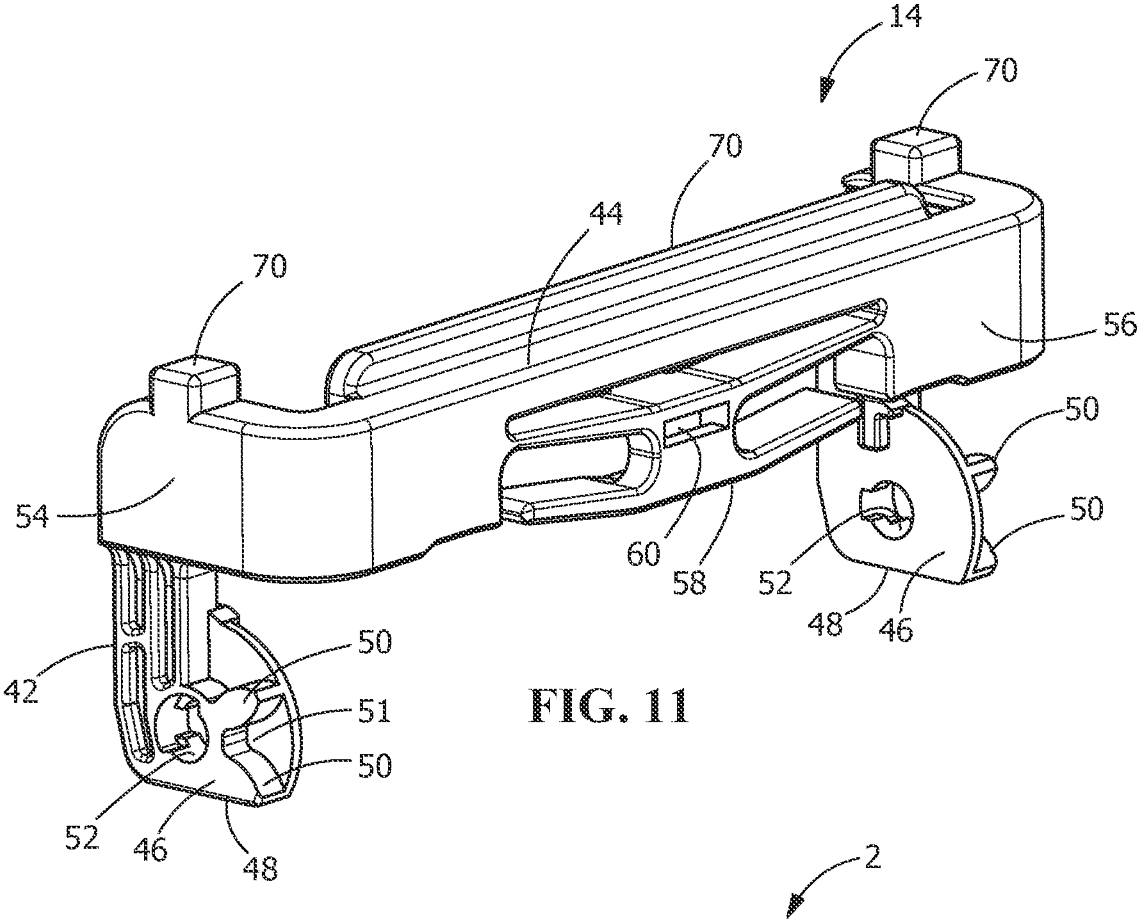
FIG. 11 is a perspective view of a fourth embodiment of a lever having engagement projections extending therefrom.

The lever handle 44 extends between the lever arms 42. The lever handle 44 has end portions 54 and an engagement portion 56 (as shown in FIG. 11). In the illustrative embodiment shown, the end portions 54 extend from the lever arms 42 in a direction which is essentially perpendicular to the longitudinal axis of the lever arms 42. However, in other embodiments, the end portions 54 may extend from the lever arms 42 at other angles, such as, but not limited to, forty-five degrees or sixty degrees. The engagement portion 56 of the lever handle 44 extends from the end portions 54 in a direction which is parallel to the longitudinal axis of the first connector housing 12 of the plug connector 10. The engagement portion 56 is offset from the longitudinal axis of the lever arms 42.

As shown in FIG. 11, a resilient locking arm 58 is provided on the lever handle 44. The resilient locking arm 58 has a latching or locking projection 60. The locking projection 60 is in line with the locking opening 36.

Figure 3:
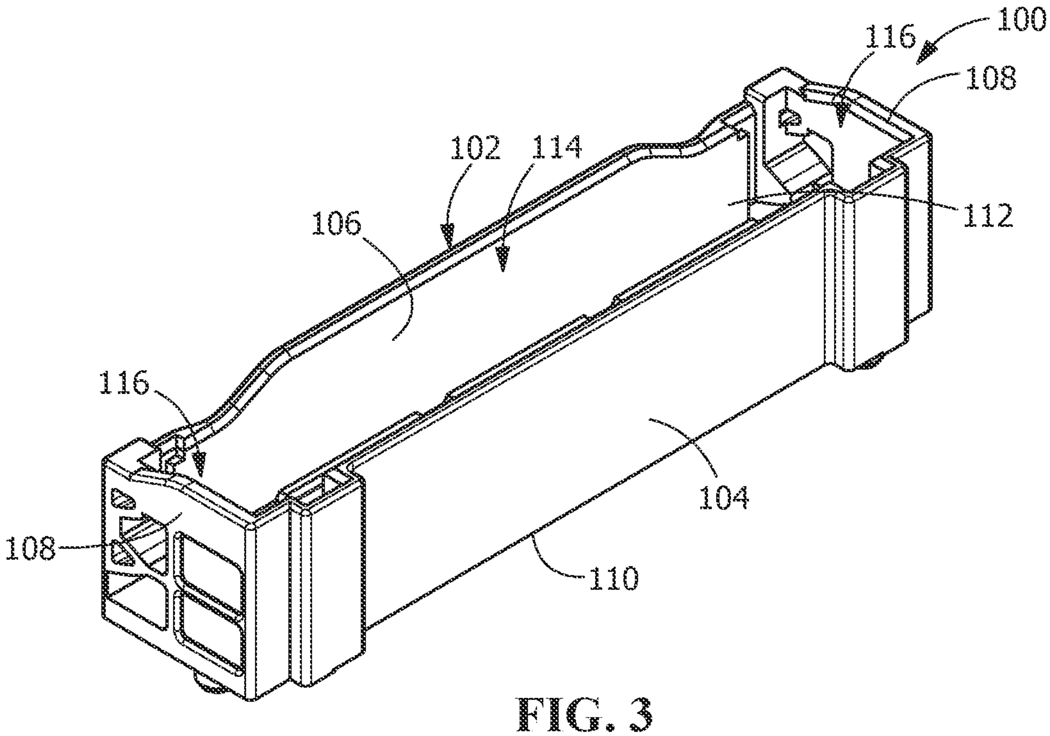
FIG. 3 is a perspective view of the second connector of FIG. 1.

Referring to FIG. 3, the second or mating connector 100 has a second connector housing 102 which includes a front or first wall 104, a rear or second wall 106, and side walls 108. A circuit board mounting face 110 and an oppositely facing first connector mating face 112 each extend between the first wall 104 and the second wall 106, and between the side walls 108. A connector receiving recess or area 114 extends between the circuit board mounting face 110 and the first connector mating face 112. Terminals (not shown) also extend into the connector receiving area 114 from the circuit board mounting face 110.

A lever receiving recess 116 is provided adjacent to the connector receiving recess or area 114 at either end of the second connector housing 102. Each lever receiving recess 116 extends between the circuit board mounting face 110 and the first connector mating face 112.

In the embodiment shown in FIGS. 1 through 5, each lever receiving recess 116 has a single projection or tooth 118 which extends from the second wall 106 in a direction toward the first wall 104. The single projection or tooth 118 is provided proximate to, but spaced from, the mounting face 110. There are no other projections which extend from the second wall 106 into the lever receiving recess 116.

Figure 4:
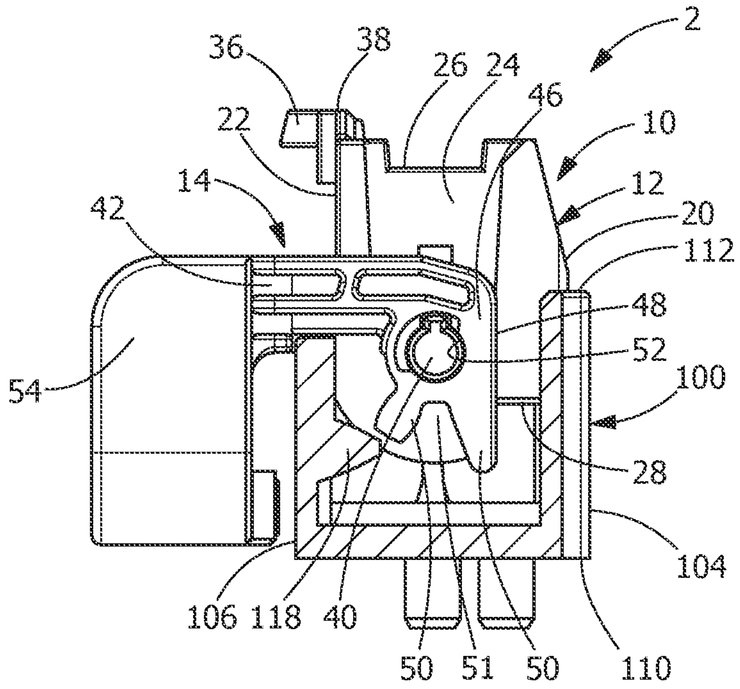
FIG. 4 is a cross-sectional view taken along line 4-4 of FIG. 1.

When the connector assembly 2 is initially assembled, the first connector 10 is positioned in the connector receiving recess or area 114 of the second connector 110, as is shown in FIGS. 1 and 4. In this position, the teeth 50 and recesses 51 of the rotary portions 46 of the free ends 48 of the lever arms 42 are at least partially positioned in the lever receiving recesses 116. FIGS. 1 and 4 show the lever 14 in a first, initial, open or pre-insertion position.

Figure 5:
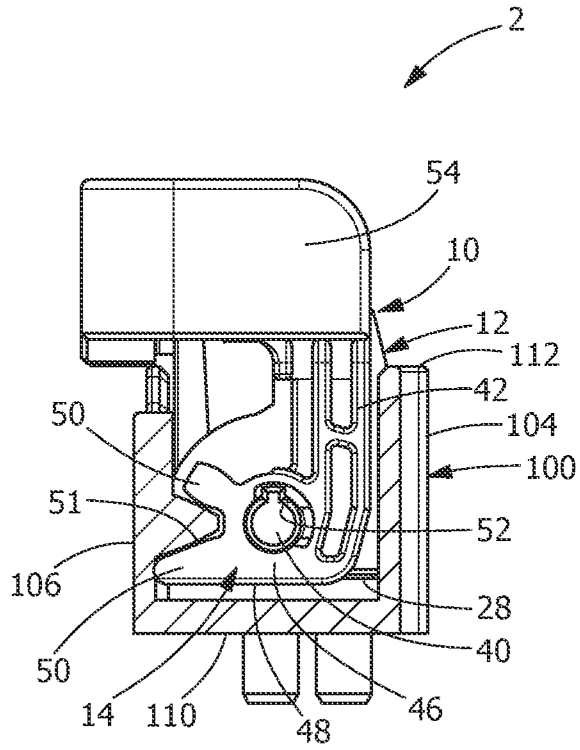
FIG. 5 is a cross-sectional view similar to FIG. 4, showing the lever in a second or insertion position.

In order to fully insert the first connector 10 into the connector receiving recess or area 114 of the second connector 110, the lever 14 is rotated from the first, initial, open or pre-insertion position, as shown in FIG. 4, to a second, final, closed or insertion position, as shown in FIG. 5. As the lever 14 is rotated the pinion teeth 50 of the lever arms 44 engage the single projection or tooth 118 in each lever receiving recess 116. The continued rotation of the lever 14 and the engagement pinion teeth 50 with the single projection or tooth 118 causes the first connector 10 to be drawn or forced into the connector receiving recess or area 114 of the second connector 100. As this occurs, the lever 14 provides the mechanical assist needed to overcome the high mating force associated with the high number of terminals positioned in the first connector 10 and the second connector 100.

When in the second, final, closed or insertion position, the latching or locking projection 60 engages the locking opening 36 to retain the lever 14 in the second, final, closed or insertion position. This prevents the unwanted movement of the lever 14 back toward the first, initial, open or pre-insertion position.

In order to release the lever 14 from the insertion position, the locking projection 60 is disengaged from the locking opening 36, allowing the lever 14 to be moved from the second, final, closed or insertion position to the first, initial, open or pre-insertion position.

In the embodiment shown in FIGS. 1 through 5, only one projection or tooth 118 is provided in each lever receiving recesses 116. There are no other projections or teeth which extend from the second wall 106 into the lever receiving recess 116. This allows the teeth 50 and recesses 51 of the rotary portions 46 of the free ends 48 of the lever arms 42 to fall and freely rotate without obstruction until the teeth 50 and recesses 51 engage the one projection or tooth 118 in each lever receiving recesses 116.

In known configurations, multiple projections or teeth are provided in each lever receiving recess. Consequently, as the lever is rotated, the teeth on the free end of the lever can engage the teeth in the lever receiving recess which are removed from the circuit board mounting face. This results in the first connector not being fully mated with the second connector, while providing the user with a false sense that the connectors have been fully mated. The use of only one projection or tooth 118 provided in each lever receiving recesses 116 eliminates the possibility that the lever 14 of the first connector 10 can prematurely engage/lock with the tooth 118 of the second connector 100 and ensures that the first connector 10 and the second connector 100 are properly mated when the lever 14 is fully rotated.

Figure 6:
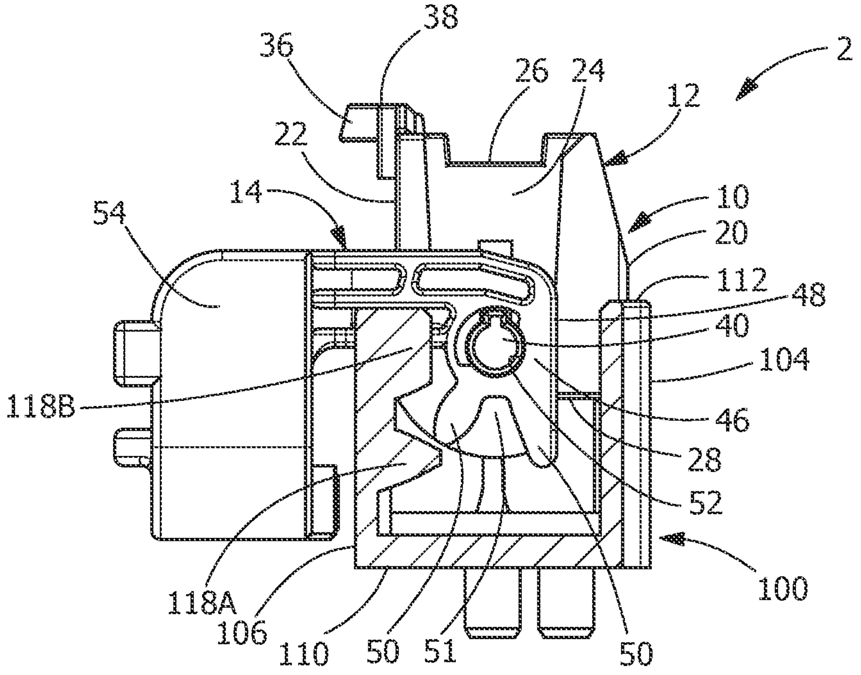
FIG. 6 is a cross-sectional of a second illustrative connector, showing the lever in a first or pre-insertion position.
Figure 7:
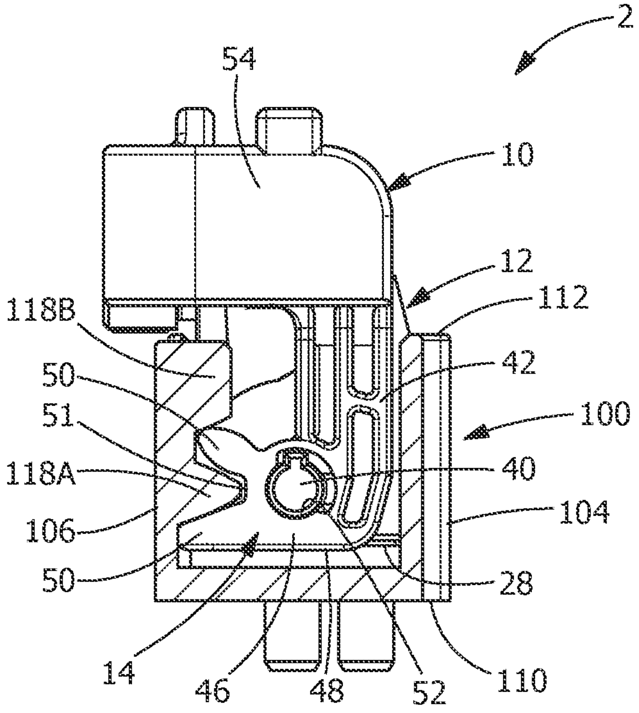
FIG. 7 is a cross-sectional view similar to FIG. 6, showing the lever in a second or insertion position.

Referring to FIGS. 6 and 7, a second illustrative embodiment of the connector assembly 2 is shown. In this embodiment, the first connector 10 and lever 14 are similar to that described above. The second connector 100 is also similar to that described above, with the exception that there is more than one projection or teeth 118.

In this embodiment, each lever receiving recess 116 has multiple projections or teeth 118 which extend from the second wall 106 in a direction toward the first wall 104. In the embodiment shown, two projection or teeth 118 are provided in each lever receiving recess 116. A first projection or tooth 118A in each lever receiving recess 116 is provided proximate to, but spaced from, the mounting face 110. A second projection or tooth 118B is provided proximate to, but spaced from, the first connector mating face 112.

The first projection or tooth 118A is configured to cooperate and engage with the teeth 50 and recesses 51 of the rotary portions 46 of the free ends 48 of the lever arms 42. The second projection or tooth 118B has a different configuration than the first projection or tooth 118A. The second projection or tooth 118B is configured to prevent the teeth 50 and recesses 51 of the rotary portions 46 of the free ends 48 of the lever arms 42 from fully engaging the second projection or tooth 118B.

In the embodiment, as the lever 14 is rotated from the first, initial, open or pre-insertion position, as shown in FIG. 6, to a second, final, closed or insertion position, as shown in FIG. 7, the lever is prevented from being fully rotated or engaged unless the teeth 50 and recesses 51 of the rotary portions 46 of the free ends 48 of the lever arms 42 are aligned with the first projection or tooth 118A. If not properly aligned, the second projection or tooth 118B engages the teeth 50 and recesses 51 of the rotary portions 46 of the free ends 48 of the lever arms 42 to prevent the complete rotation of the lever 14 to the second, final, closed or insertion position. The use of two projections 118A, 118B having different configuration eliminates the possibility that the lever 14 of the first connector 10 can prematurely engage/lock with the second projection or tooth 118B of the second connector 100 and ensures that the first connector 10 and the second connector 100 are properly mated when the lever 14 is fully rotated.

Figure 8:
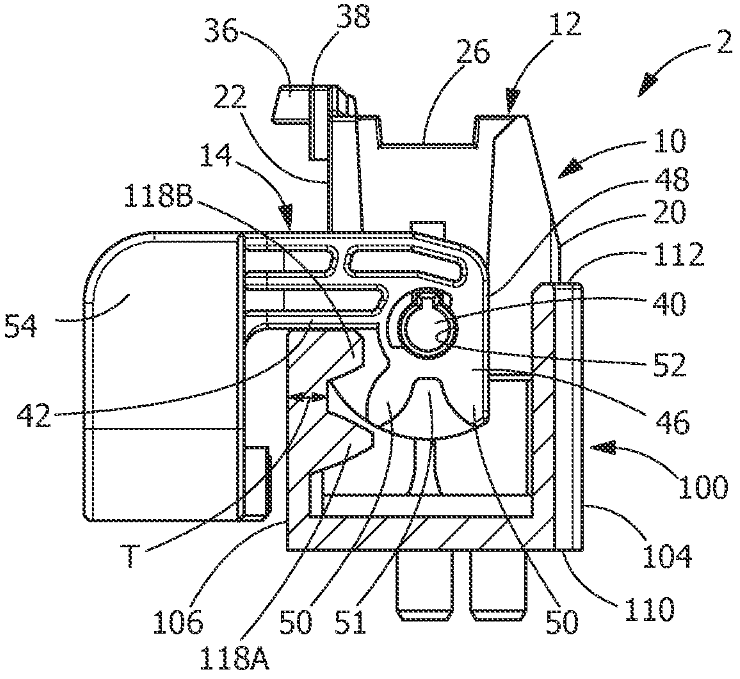
FIG. 8 is a cross-sectional of a third illustrative connector, showing the lever in a first or pre-insertion position.
Figure 9:
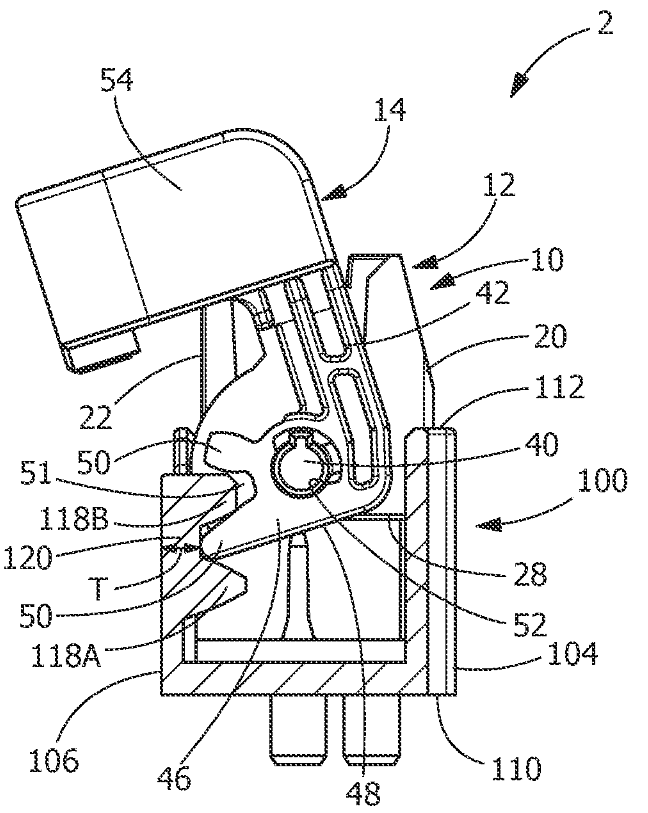
FIG. 9 is a cross-sectional view similar to FIG. 8, showing the lever is an intermediate position, in which the lever is prevented from further movement toward a second or insertion position.
Figure 10:
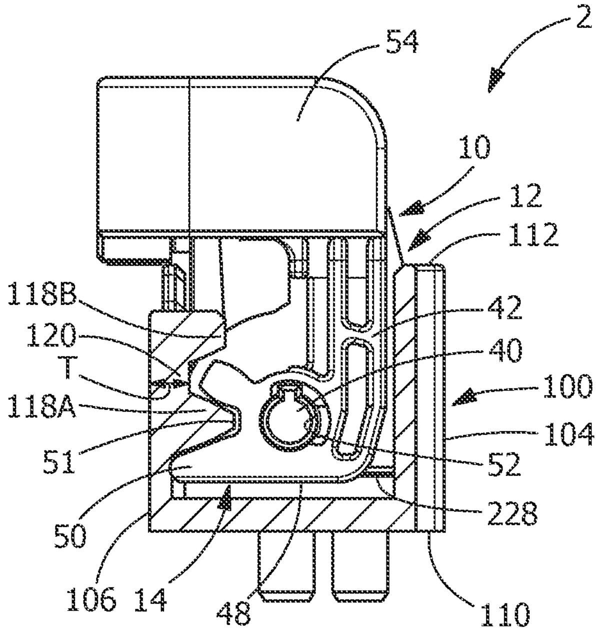
FIG. 10 is a cross-sectional view similar to FIG. 8, showing the lever in a second or insertion position.

Referring to FIGS. 8 through 10, a third illustrative embodiment of the connector assembly 2 is shown. In this embodiment, the first connector 10 and lever 14 are similar to that described above, except as described below.

In this embodiment, each lever receiving recess 116 has multiple projections or teeth 118 which extend from the second wall 106 in a direction toward the first wall 104. In the embodiment shown, two projection or teeth 118 are provided in each lever receiving recess 116. A first projection or tooth 118A in each lever receiving recess 116 is provided proximate to, but spaced from, the mounting face 110. A second projection or tooth 118B is provided proximate to, but spaced from, the first connector mating face 112.

The first projection or tooth 118A is configured to cooperate and engage with the teeth 50 and recesses 51 of the rotary portions 46 of the free ends 48 of the lever arms 42. The second projection or tooth 118B may have a different configuration than the first projection or tooth 118A or may have a similar configuration to the first projection or tooth 118A.

A portion 120 of the second side wall 106 has a larger thickness T than the reminder of the second side wall 120. Alternatively, or in addition to, one tooth 50A of the rotary portions 46 of the free ends 48 of the lever arms 42 may have a longer length L than the other teeth 50. The configuration of the portion 120 of the second side wall 106 and/or the configuration of the tooth 50A is configured to prevent the full rotation of the lever 14 unless the first connector 10 and the second connector 100 are fully mated.

In the embodiment, as the lever 14 is rotated from the first, initial, open or pre-insertion position, as shown in FIG. 8, to a second, final, closed or insertion position, as shown in FIG. 10, the lever is prevented from being fully rotated unless the first connector 10 is fully mated with the second connector 110. If not properly aligned, the tooth 50A engages the enlarged portion 120 to prevent the complete rotation of the lever 14 to the second, final, closed or insertion position, as shown in FIG. 9. The use of the portion 120 of the second side wall 106 and/or the configuration of the tooth eliminates the possibility that the lever 14 of the first connector 10 can prematurely engage/lock and ensures that the first connector 10 and the second connector 100 are properly mated when the lever 14 is fully rotated.

Figure 12:
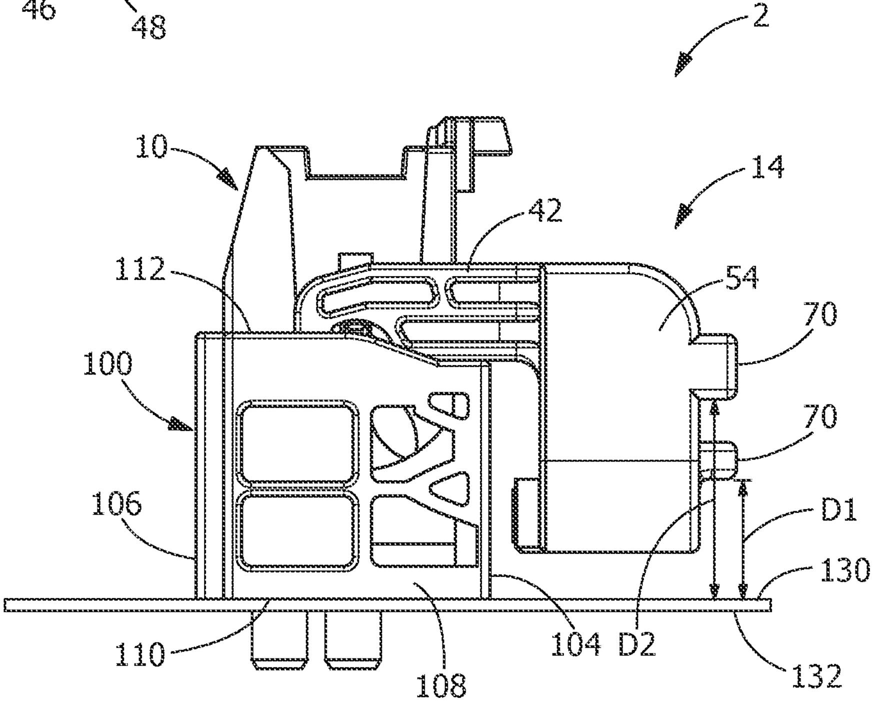
FIG. 12 is a side view of an illustrative connector with the lever of FIG. 11 position on a circuit board, the lever is shown in a first or pre-insertion position.

As shown in FIGS. 11 and 12, a fourth embodiment of the lever 14 is shown. In this embodiment, the first connector 10 and lever 14 are similar to that described above, except as described below.

In this embodiment, at least one lever lift assist protrusions or projection 70 is provided on the lever 14. One or more lever lift assist projections 70 may be provided on the lever arms 42 and/or one or more lever lift assist protrusions or projections 70. The lever lift assist protrusions or projections 70 shown are meant to be illustrative, as various locations and configurations of the lever lift assist protrusions or projections 70 may be used.

When the first connector 10 is inserted into the connector receiving recess or area 114 of the second connector 100, the lever handle 44 of the lever 14 is positioned approximately parallel with a surface 130 of a printed circuit board or substrate 132, as shown in FIG. 12. There is only a small amount of clearance present between the lever handle 44 and the surface 130 of the printed circuit board or substrate 132. This clearance allows the lever 14 to be used when components, i.e. chips, etc., are mounted on the printed circuit board or substrate 132. However, the small amount of space between the lever handle 44 and the surface 130 of the printed circuit board or substrate 132 makes it difficult for an operator to grip the lever 14 and begin to rotate the lever 14 from the first, initial, open or pre-insertion position, as shown in FIG. 12, to the second, final, closed or insertion position. In order to overcome this issue, one or more lever lift assist protrusions or projections 70 were added at a height off the PCB, which permits the operator to grip/lift the one or more lever lift assist protrusions or projections 70 of the lever 14 to rotate the lever 14 from the first, initial, open or pre-insertion position to the second, final, closed or insertion position.

By adding one or more lever lift assist protrusions or projections 70 to the lever 14 at a position where they spaced at a distance D1, D2 high enough off the surface 130 of the printed circuit board or substrate 132, the operator can grip and rotate the lever 14 as needed.

While the invention has been described with reference to a preferred embodiment, it will be understood by those skilled in the art that various changes may be made and equivalents may be substituted for elements thereof without departing from the spirit and scope of the invention as defined in the accompanying claims. One skilled in the art will appreciate that the invention may be used with many modifications of structure, arrangement, proportions, sizes, materials and components and otherwise used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

The invention claimed is:

1. A connector assembly comprising:

a first connector housing comprising;

a lever rotatably mounted relative to the first connector housing, the lever having lever arms having projections provided at free ends of the lever arms, a first projection of the projections has a longer length than a second projection of the projections;

a second connector housing comprising;

a connector receiving area for receiving the first connector housing therein, the connector receiving area extending from a connector mating face of the second connector housing;

a lever receiving recess proximate the connector receiving area, the lever receiving recess having a latching projection and a latch prevention projection provided therein, the latching projection and the latch prevention projection extending from a side wall of the second connector housing, the side wall extending between the second connector mating face and an oppositely facing mounting surface of the second connector housing, the latching projection configured to cooperate with the projections of the lever, a first portion of the side wall extending between the latch prevention projection and the latching projection has a larger thickness than a second portion of the side wall extending between the latching projection and the mounting surface;

wherein the lever is rotatable between a pre-insertion position and an insertion position; and wherein the cooperation of the first projection of the projections of the lever with the first portion of the side wall of the lever receiving recess prevents the premature mating of the first connector housing to the second connector housing as the lever is moved between the pre-insertion position and the insertion position, and the cooperation of the first projection of the projections with the second portion of the side wall allows for the first connector housing to be moved to the insertion position in the second connector housing.

2. The connector assembly as recited in claim 1, wherein the latching projection of the second connector is a latching tooth provided proximate to, but spaced from, the mounting surface of the second connector housing.

3. The connector assembly as recited in claim 2, wherein the projections of the first connector are latching teeth spaced apart by recesses.

4. The connector assembly as recited in claim 1, wherein the lever has at least one lever lift assistant projection which extends therefrom, the at least one lever left assistant projection is spaced from a substrate on which the first housing is mounted when the lever is in the pre-insertion position to allow an operator to engage and rotate the lever to the insertion position.

5. The connector assembly as recited in claim 4, wherein the at least one lever lift assistant projection extends from a lever handle which extends between the lever arms.

6. The connector assembly as recited in claim 4, wherein the at least one lever lift assistant projection extends from the lever arms.

7. A connector assembly comprising:

a first connector comprising;

a first connector housing;

a lever rotatably mounted relative to the first connector housing, the lever having lever arms having projections provided at free ends of the lever arms, a first projection of the projections has a longer length than a second projection of the projections;

a second connector comprising;

a second connector housing;

a lever receiving recess having a side wall with a latching projection and a latch prevention projection extending therefrom, the latching projection configured to cooperate with the projections of the first connector housing, a first portion of the side wall extending between the latch prevention projection and the latching projection has a larger thickness than a second portion of the side wall extending between the latching projection and a mounting surface of the second connector housing, the latching projection have a different having a different configuration than the latch prevention projection;

wherein the lever is rotatable between a pre-insertion position and an insertion position; and wherein the cooperation of the first projection of the projections of the lever with the first portion of the side wall of the lever receiving recess prevents the premature mating of the first connector housing to the second connector housing as the lever is moved between the pre-insertion position and the insertion position, and the cooperation of the first projection of the projections with the second portion of the side wall allows for the first connector housing to be moved to the insertion position in the second connector housing.

8. The connector assembly as recited in claim 7, wherein the latching projection of the second connector is a latching tooth provided proximate to, but spaced from, the mounting surface of the second connector housing.

9. The connector assembly as recited in claim 8, wherein the projections of the first connector are latching teeth spaced apart by recesses.

10. The connector assembly as recited in claim 7, wherein the lever has at least one lever lift assistant projection which extends therefrom, the at least one lever left assistant projection is spaced from a substrate on which the first housing is mounted when the lever is in the pre-insertion position to allow an operator to engage and rotate the lever to the insertion position.

11. The connector assembly as recited in claim 10, wherein the at least one lever lift assistant projection extends from a lever handle which extends between the lever arms.

12. The connector assembly as recited in claim 10, wherein the at least one lever lift assistant projection extends from the lever arms.

* * * * *